April 12, 1932. M. KAPLAN 1,853,902
PLAQUE, POCKET MIRROR, AND LIKE DISPLAY DEVICE
Filed Sept. 23, 1930
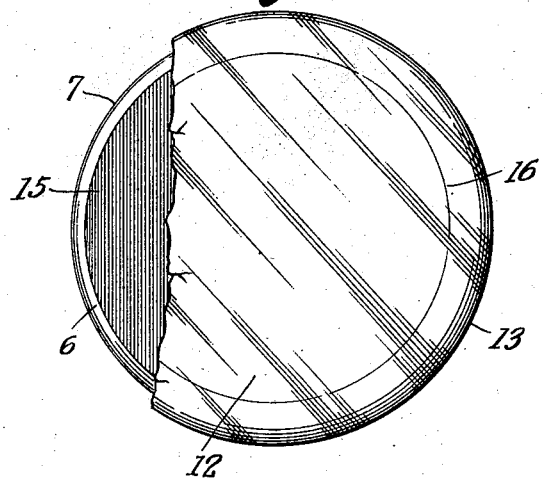
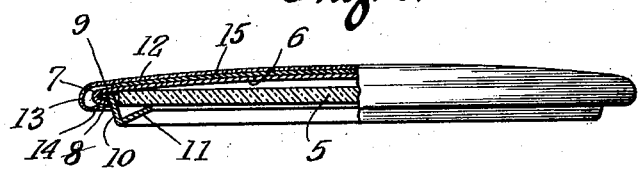
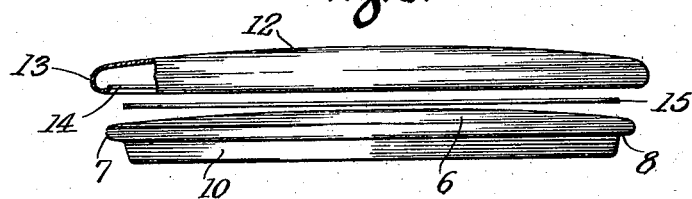
INVENTOR
Max Kaplan
BY
Percy Freeman
ATTORNEY Patented Apr. 12, 1932

1,853,902

UNITED STATES PATENT OFFICE

MAX KAPLAN, OF NEW YORK, N. Y.

PLAQUE, POCKET MIRROR, AND LIKE DISPLAY DEVICE

Application filed September 23, 1930. Serial No. 483,825.

This invention relates to plaques, pocket mirrors and like display devices intended for ornamental purposes and adapted to receive and retain thin objects, such as photographs, etc., visibly through a transparent cover.

Similar devices, as commonly constructed, present very considerable difficulties in mounting a picture, and further, are composed of a number of separate elements which fall apart upon the removal of the cover.

It is therefore one of the objects of the present invention to provide a device of the type indicated in which the mirror is mechanically confined within a protective backing, forming a unit therewith.

A further feature is in the provision of a transparent cover for the edge and rear of the backing, easily applied and removed, and adapted to hold a picture in position to be seen when the mirror is directed away from the observer.

These and other advantageous features, such as simplicity, ease of operation in changing pictures, and neatness of appearance, are secured by the novel design, construction and combination of parts hereinafter described and shown in the accompanying drawings forming part of this disclosure, and in which:

Fig. 1 is a rear plan view of an embodiment of the invention, partially broken away to show the construction.

Fig. 2 is a partial edge view, and partial transverse sectional view of the same.

Fig. 3 is an expanded edge view of the cover, picture and mirror holding unit in their respective positions prior to assembly.

Referring to the drawings in greater detail, a mirror of any preferred type is designated by the numeral 5, here shown in Fig. 2, as being flat, and of uniform thickness.

The edge of the mirror seats on the inner surface of a concavo-convex backing 6, preferably stamped from sheet metal and having a rounded inturned beaded edge 7 its outer element 8 being disposed at a slight angle outwardly.

Held within the bead is a flange 9 formed on the peripheral edge of a bevelled metallic ring 10 against which the edge of the mirror 5 makes contact, and formed on the lower, convergent portion of the ring 10 in another flange 11 turned angularly upward so that its inner edge impinges on the marginal surface of the mirror, holding it rigidly in assembled position, these several elements thus constituting a non-separable unit.

A cover 12 of transparent material, such for instance as celluloid, and having inherent elasticity, is shaped to conform to the outer convex side of the backing 6; the edge of the cover is shaped to present an open bead 13, its inner diameter exceeding that of the backing, as best seen in Fig. 2, and its extreme edge 14 is inturned to engage over the surface of the backing element 8.

Due to space between the peripheral edges of the elements 7 and 13, and to the resiliency of the cover material, the backing, ring and mirror, as a unit may be easily entered within the cover or removed at will, and when the backing is enclosed by its cover it is held firmly by reason of the spring effect of the edge 14.

This condition enables the insertion or removal of a photograph, card or the like 15 which appears through the cover 12 due to its transparency, and it will be understood that the cover may be printed or otherwise marginally ornamented as at 16, to present the effect of a frame around the inserted object.

Although the foregoing is descriptive of the preferred embodiment of the invention, it will be apparent that minor changes may be made in the construction, without the exercise of invention or conflicting with the scope of the claims hereto appended.

Having thus described my invention, what I claim as new and desire to secure by Letters Patent, is:

1. The combination with a pocket mirror, having a beaded backing therefor, of a transparent cover having an enlarged prehensile bead to resiliently engage over the backing bead and retain an article disposed on the surface of said backing.

2. The combination with a display device having a concavo-convex backing therefor, said backing having a bead, of a flexible transparent cover spaced adjacent said backing, and an open bead on said cover having a resilient edge to engage the backing bead.

3. A display device comprising a beaded unit containing a mirror, and a transparent cover having a prehensile edge to resiliently engage over the bead of said unit to clamp an article therebetween.

Signed at New York, in the county and State of New York, this 21st day of August, 1930.

MAX KAPLAN.